(12) United States Patent
Grüneklee et al.

(10) Patent No.: US 9,283,991 B2
(45) Date of Patent: Mar. 15, 2016

(54) FRONT-END STRUCTURE

(71) Applicants: ThyssenKrupp Steel Europe AG, Duisburg (DE); ThyssenKrupp AG, Essen (DE)

(72) Inventors: Axel Grüneklee, Duisburg (DE); Martin Kibben, Dinslaken (DE); Markus Zörnack, Attendorn (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 0 days.

(21) Appl. No.: 14/736,351

(22) Filed: Jun. 11, 2015

(65) Prior Publication Data

US 2015/0360724 A1  Dec. 17, 2015

(30) Foreign Application Priority Data

Jun. 13, 2014  (DE) .......................... 10 2014 008 402

(51) Int. Cl.
*B62D 21/00* (2006.01)
*B62D 21/15* (2006.01)
*B62D 27/02* (2006.01)

(52) U.S. Cl.
CPC .............. *B62D 21/152* (2013.01); *B62D 27/02* (2013.01)

(58) Field of Classification Search
CPC .............................. B62D 21/152; B62D 27/02
USPC .......................................... 296/187.1, 187.09
See application file for complete search history.

(56) References Cited

U.S. PATENT DOCUMENTS

2012/0313398 A1* 12/2012 Shin et al. .................. 296/187.1
2013/0241233 A1   9/2013 Ohnaka et al.

FOREIGN PATENT DOCUMENTS

WO   2014042257 A1   3/2014

* cited by examiner

*Primary Examiner* — Joseph D Pape
(74) *Attorney, Agent, or Firm* — The Webb Law Firm

(57) ABSTRACT

A front-end structure includes at least one lower longitudinal member and an absorber which is arranged on an outer side of a vehicle on the at least one lower longitudinal member and, in the event of an impact with a small overlap, provides an energy-absorbing load path into the at least one lower longitudinal member, wherein at least one deformation element is provided which is arranged at least between the absorber and a suspension strut dome and is connected to both thereof in a in a positive, non-positive and/or integrally bonded manner.

6 Claims, 1 Drawing Sheet

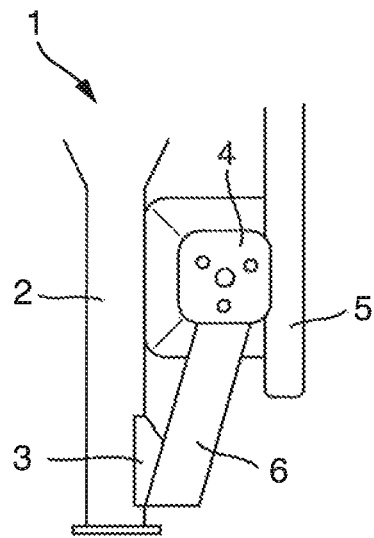
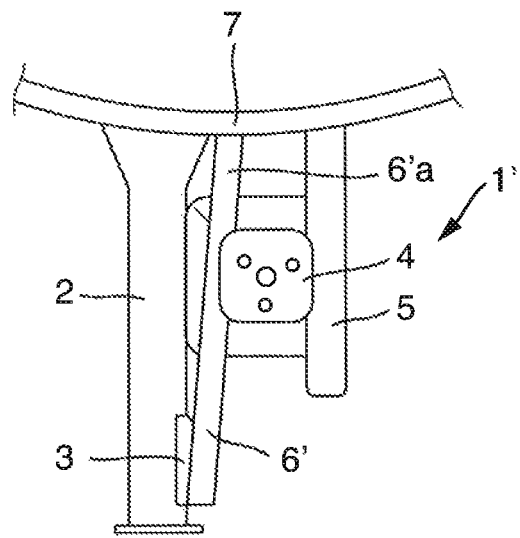
Fig. 1  Fig. 2
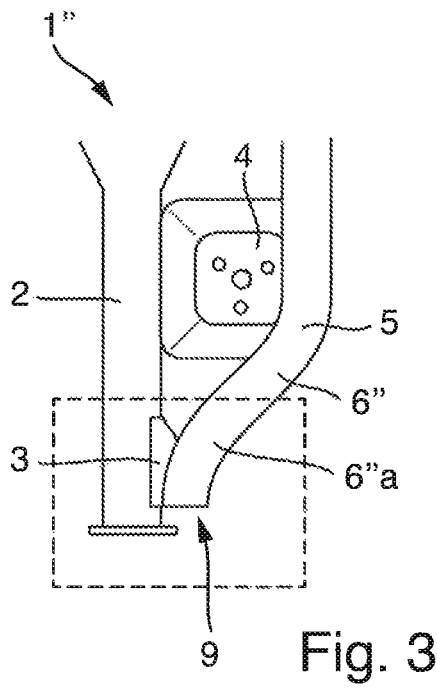
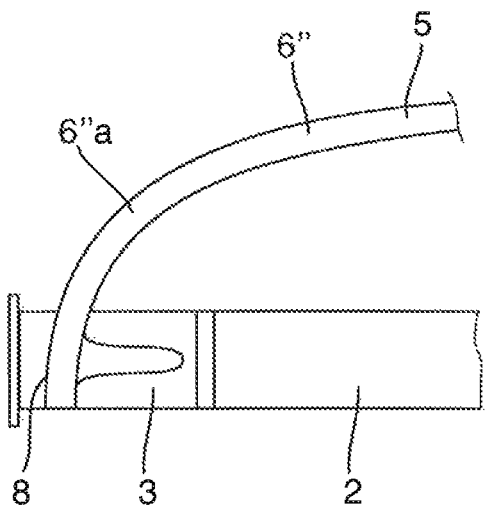
Fig. 3  Fig. 4

FRONT-END STRUCTURE

CROSS-REFERENCE TO RELATED APPLICATION

This application claims priority to German Patent Application No. 10 2014 008 402.7 filed Jun. 13, 2014, the disclosure of which is hereby incorporated in its entirety by reference.

BACKGROUND OF THE INVENTION

1. Field of the Invention

The invention relates to a front-end structure with at least one lower longitudinal member and an absorber which is arranged on the outer side of the vehicle on the at least one longitudinal member and, in the event of an impact with a small overlap, provides an energy-absorbing load path into the at least one lower longitudinal member, wherein at least one deformation element is provided which is arranged at least between the absorber and a suspension strut dome and is connected to both thereof in a positive, non-positive and/or integrally bonded manner.

2. Description of Related Art

The lower longitudinal members are central units of each front-end structure and, as safety-relevant assemblies, substantially contribute to protecting the passenger compartment in the event of a crash. A more exacting requirement, new since 2012, regarding occupant protection is the "Small Overlap Rigid Barrier" (SORB) presented by the IIHS (Insurance Institute for Highway Safety), in which a vehicle is driven at a speed of 64 km/h against a barrier with an approx. 25% overlap. Front-end structures of the type in question are known from the prior art. The International patent publication WO 2014/042257 A1 discloses a front-end structure which has a lower longitudinal member on both the left and right side of the vehicle, the longitudinal members being equipped with an absorber arranged on the outer side of the vehicle, said absorbers providing or ensuring an energy-absorbing load path into the respective lower longitudinal member in the event of an impact with a small overlap. US application document 2013/0241233 discloses a further front-end structure. Although the front-end structures disclosed meet the requirements set for the IIHS load situation (SORB), there is further potential for improvement for increasing the occupant protection.

Taking this as the starting point, it is the object of the present invention to provide a front-end structure which has an improved energy-absorption and intrusion behaviour.

SUMMARY OF THE INVENTION

The object presented for a front-end structure of the type in question is achieved in that the deformation element has a tab-like element which is arranged at least in the direction of travel and is designed in such a manner that, in the case of absorbers which have a structure which is open in the direction of travel, said tab-like element closes said open structure at least in regions.

The inventors have determined that by providing at least one deformation element which is arranged at least between the absorber and the suspension strut dome and is connected to both thereof in a positive, non-positive and/or integrally bonded manner, a further energy-absorbing load path can be provided, wherein the energy which is introduced is converted by controlled deformation of the deformation element between the absorber and the suspension strut dome and therefore the loadings on the passenger compartment can be reduced. According to the invention, the deformation element has a tab-like element which is arranged at least in the direction of travel and is designed in such a manner that, in the case of absorbers which have, for example, a structure which is open in the direction of travel, said tab-like element closes said open structure at least in regions, preferably completely. This has the advantage that no additional closing part has to be used. Furthermore, the tab-like element can advantageously also be used for the positive, non-positive and/or integrally bonded coupling to the absorber. Furthermore, the deformation element can also have a tab-like element in the direction of the passenger compartment for the positive, non-positive and/or integrally bonded coupling.

According to a first embodiment of the invention, the deformation element is composed of an assembled and/or closed profile. Shell parts which are joined together, for example, from at least two half shells, in particular with arbitrary geometry, preferably by resistance spot welding, but also by laser welding, MIG welding, MAG welding, soldering and by adhesives and/or by mechanical joining methods, such as, for example, hollow punch riveting and/or a combination thereof can be used as an assembled profile. A closed profile can be produced, for example, from a sheet metal blank which is welded, for example in a U-O process, to form a slotted profile and subsequently to form a closed profile. Alternatively, use can also be made of a rolled profile which can be produced cost-effectively.

In a further embodiment of the invention, the component is coupled in the upper region of the suspension strut dome. This has the advantage that the deformation element is coupled to or incorporated in the suspension strut dome in a manner such that the deformation element can take on rigidity-relevant functions in the upper region of the suspension strut dome. As a result, geometrical portions of the suspension strut dome can be taken on by the deformation element and therefore the increase in weight due to the new load path can be minimised for the entire vehicle.

In a further embodiment of the invention, the deformation element is designed as a separate additional element. The configuration of the geometry of the deformation element can be individually influenced taking into consideration, for example, simulation crash results and taking the available construction space into consideration. The deformation element is preferably coupled or incorporated on the inner side of the vehicle to or in the suspension strut dome and has an extension in the direction of the passenger compartment, the end of which extension is coupled to a further body part, for example to the lower cross member below the windscreen. This extension permits further energy to be converted by targeted deformations. After the suspension strut dome, the load path can also be distributed to further body parts, as a result of which an improvement in the occupant protection is possible by means of a uniform distribution of the forces.

Alternatively, a body part which is already present and is designed, for example, as an upper longitudinal member can also be provided in the direction of travel with an extension which is coupled to the absorber. This has the advantage that an extension of the existing load path can be provided in a very narrow construction space in the front end, as a result of which improved occupant protection can be ensured with only a slight increase in weight.

BRIEF DESCRIPTION OF THE DRAWINGS

The invention is explained in more detail below with reference to a drawing illustrating exemplary embodiments. Identical parts are provided with the same reference numbers. In the drawing:

FIG. 1: shows a first exemplary embodiment of a front-end structure according to the invention in a schematic top view, FIG. 2: shows a second exemplary embodiment of a front-end structure according to the invention in a schematic top view, FIG. 3: shows a third exemplary embodiment of a front-end structure according to the invention in a schematic top view, FIG. 4: shows a schematic side view of the detail from FIG. 3.

DESCRIPTION OF THE INVENTION

FIG. 1 shows, in a schematic top view, a first exemplary embodiment of a front-end structure (1) according to the invention. For the sake of clarity, only essential components of the invention are illustrated. A left lower longitudinal member (2) is illustrated, which, in addition to protecting the passenger compartment, also serves for receiving, for example, chassis and subframe couplings (not illustrated here), and is customarily assembled from a shell structure. In order to satisfy the SORB load situation, an absorber (3) which is preferably of wedge-shaped design is arranged on the outer side of the vehicle in the front region of the longitudinal member (2). A suspension strut dome (4) is arranged between the upper longitudinal member (5) and the lower longitudinal member (2) and is customarily connected to both thereof by resistance spot welding or, for example, by hollow punch rivets by means of additional adhesive bonding. The upper longitudinal member (5) can likewise be connected (not illustrated here) to the lower longitudinal member (2). In order to improve the occupant protection, a deformation element (6), for example an assembled and/or closed separate profile is provided which is arranged between the absorber (3) and the suspension strut dome (4) and is connected to both thereof in a positive, non-positive and/or integrally bonded manner. By means of the provision of the deformation element (6), a further load path is available which, in the event of an impact with a small overlap, converts part of the energy by means of controlled deformation and is supported in the direction of the suspension strut dome (4) which is customarily of solid design. It is not explicitly illustrated that the deformation element (6) is coupled in the upper region of the suspension strut dome (4) and extends in the direction of travel, for example in a curved manner in the direction of the lower longitudinal member plane in order to ensure a sufficient distance from the front wheel, and is coupled in the front region of the absorber (3).

FIG. 2 illustrates a second exemplary embodiment of a front-end structure (1') according to the invention in a schematic top view. The designs of the lower longitudinal member (2), of the upper longitudinal member (5), of the suspension strut dome (4) and of the absorber (3) correspond to those in FIG. 1, but with the difference that a separate deformation element (6') is coupled in the front region of the absorber (3) and furthermore runs in the direction of the passenger compartment (not illustrated), wherein the deformation element (6') is coupled on the inner side of the vehicle in preferably the upper region of the suspension strut dome (4) and has an extension (6'a) in the direction of the passenger compartment, the end of which extension is coupled to a further body part, for example to the lower cross member (7) below the windscreen. Between absorber (3) and suspension strut dome (4), the deformation element (6') can be formed in a curved manner, for example as described with respect to FIG. 1 or as illustrated in FIG. 4, or with a different shape, in order to ensure a sufficient distance from the front wheel. In the event of an impact with a small overlap, the deformation element (6') distributes part of the energy to further body parts (4, 7), thus improving the occupant protection by means of a uniform distribution of the forces.

FIG. 3 illustrates a third exemplary embodiment of a front-end structure (1") according to the invention in a schematic top view. The deformation element (6") is not designed as a separate additional element, as illustrated in the aforementioned exemplary embodiments, but rather as part of the upper longitudinal member (5), wherein the upper longitudinal member (6") is provided in the direction of travel with an extension (6"a) which runs downwards in a curved manner in the direction of the lower longitudinal member plane (FIG. 4) in order to ensure a sufficient distance from the front wheel, and inwards in order to be able to be coupled in the front region of the absorber (3). The extension (6"a) has a tab-like element (8) which is arranged at least in the direction of travel and is designed in such a manner that, for example, in the case of absorbers, for example in the case of absorbers (3) which are of wedge-shape design and have a structure (9) which is open in the direction of travel, said tab-like element closes said open structure at least in regions, preferably completely, and therefore an additional closing part can be omitted. The tab-like element can also be provided on the deformation elements (6, 6').

By means of the front-end structure (1, 1', 1") according to the invention, an improved energy absorption and intrusion behaviour can be produced in the event of an impact with a small overlap.

LIST OF REFERENCE NUMBERS 1, 1', 1" front-end structure
2 lower longitudinal member
3 absorber
4 suspension strut dome
5 upper longitudinal member
6, 6', 6" deformation element
6'a, 6"a extension
7 lower cross member below the windscreen
8 tab-like element
9 open structure

The invention claimed is:

1. A front-end structure for a vehicle, comprising at least one lower longitudinal member and a wedge-shaped absorber which is connected to a front region of the at least one lower longitudinal member and, wherein at least one deformation element is arranged between the absorber and a suspension strut dome and is connected to the absorber and the suspension strut dome, wherein, in the event of a vehicle impact, the deformation element converts part of vehicle impact energy by controlled deformation of the deformation element, wherein the deformation element is arranged at least in a direction of travel and is connected in a front region of the absorber and closes an open structure of the absorber in the direction of travel.

2. The front-end structure according to claim 1, wherein the deformation element is coupled to an upper region of the suspension strut dome.

3. The front-end structure according to claim 1, wherein the deformation element is a separate additional element.

4. The front-end structure according to claim 3, wherein the deformation element is coupled on an inner side of the suspension strut dome and has an extension in a direction of a passenger compartment of the vehicle, the end of extension is coupled to a further body part, comprising a lower cross member below a windscreen of the vehicle.

5. The front-end structure according to claim 1, wherein the deformation element is an upper longitudinal member arranged in the direction of travel and has an extension which is coupled to the absorber.

6. The front-end structure according to claim 1, wherein the deformation element is connected to the lower longitudinal member to close the absorber between the deformation element and the lower longitudinal member.

\* \* \* \* \*